Figure 1:
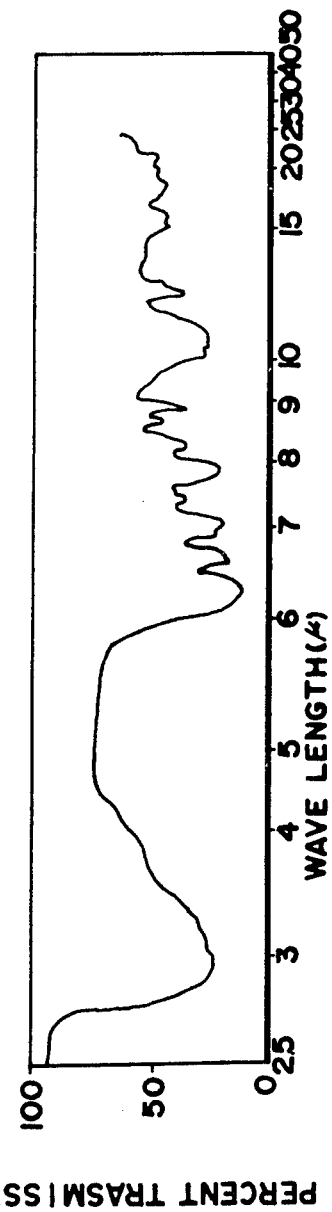

United States Patent [19]

Okada et al.

[11] 3,916,004

[45] Oct. 28, 1975

[54] PROCESS FOR PRODUCING DOPA PREPARATION

[75] Inventors: Ryuzo Okada, Tokyo; Takasi Nitanai, Narashino; Kunihiro Sasahara, Chiba, all of Japan

[73] Assignee: Sankyo Company Limited, Tokyo, Japan

[22] Filed: Nov. 27, 1973

[21] Appl. No.: 419,391

[30] Foreign Application Priority Data

Dec. 2, 1972 Japan............................ 47-120810

[52] U.S. Cl. .......... 260/429.9; 260/429; 260/438.1; 260/439 R; 260/448 R; 260/519; 260/999
[51] Int. Cl.² .......................................... C07F 3/06
[58] Field of Search.............. 260/438.1, 429.9, 519, 260/448, 429

[56] References Cited
UNITED STATES PATENTS 2,572,284    10/1951    Schoen ............................ 260/519
2,668,852    2/1954    Bentz et al. ........................ 260/519

FOREIGN PATENTS OR APPLICATIONS 1,105,103    3/1968    United Kingdom

OTHER PUBLICATIONS

J.A.C.S., Vol. 93:5, pp. 1085–1087, (1971).
Chemical Abstracts, Vol. 60, 1838b, (1964).
Chemical Abstracts, Vol. 65, 3964g, (1966).
Chemical Abstracts, Vol. 70, 25291d, (1969).
Chemical Abstracts, Vol. 67, 91108p, (1967).
Chemical Abstracts, Vol. 71, 50521g, (1969).
Chemical Abstracts, Vol. 74, 40579e, (1971).

*Primary Examiner*—Helen M. S. Sneed
*Attorney, Agent, or Firm*—Flynn & Frishauf

[57] ABSTRACT

A dopa preparation can be produced by dissolving a dopa in water and adding to the resulting aqueous solution at least one non-toxic polyvalent metal salt or an aqueous solution thereof to form a complex compound.

14 Claims, 5 Drawing Figures

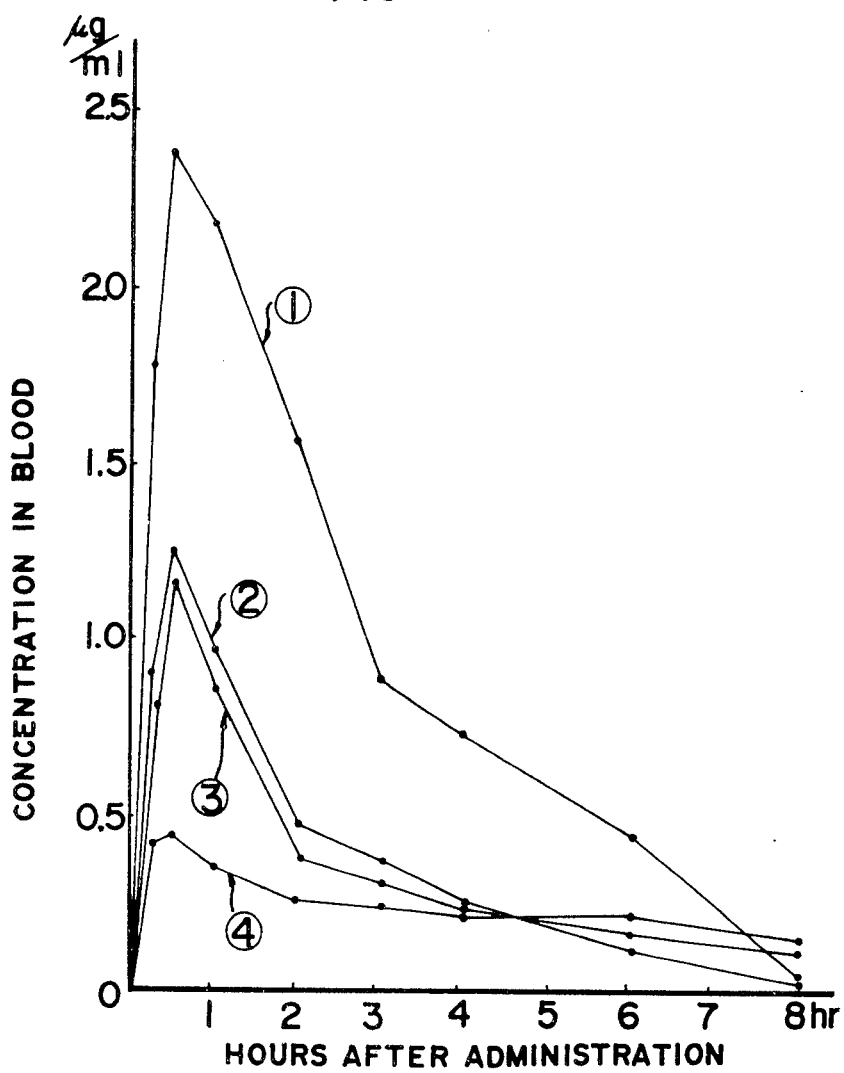

PROCESS FOR PRODUCING DOPA PREPARATION

The present invention relates to a process for producing a dopa preparation which is readily soluble in water and can be easily absorbed on administration to human body.

Typical examples of a dopa include dopa [3-(3,4-dihydroxyphenyl)-L-alanine] and methyldopa [L-3-(3,4-dihydroxyphenyl)-2-methylalanine]. The former is known as a remedy for Parkinson's disease and the latter is known as a hypotensive drug.

On administration to human body, dopas show low absorbability. Therefore, they should have been administered in a large amount in order to obtain a desired effect thereof.

Also, dopas are inconvenient to use as an injection owing to their low water-solubility. For example, the water-solubility of dopa is about 2.5 mg/ml and 20 ml of water is required for producing a preparation containing 50 mg of dopa as a dose. Therefore, a large ampoule is used but it is inconvenient to use.

Under the circumstances, a dopa preparation of good absorbability or a dopa preparation of a high concentration has been demanded clinically. However, no preparation satisfying such requirements has appeared.

An object of the present invention is to provide a dopa preparation which is readily soluble in water and can be easily absorbed on administration to human body.

Another object of the invention is to provide a dopa preparation in the form of an aqueous solution of a high concentration.

Another object of the invention is to provide a dopa preparation in the form of an amorphous complex compound.

Other objects and a full understanding of the invention may be had by referring to the following description and claims, taken in conjunction with the accompanying drawings in which:

FIG. 1 shows an IR absorption spectrum of a L-dopa.Ca complex compound, and

Figure 2:
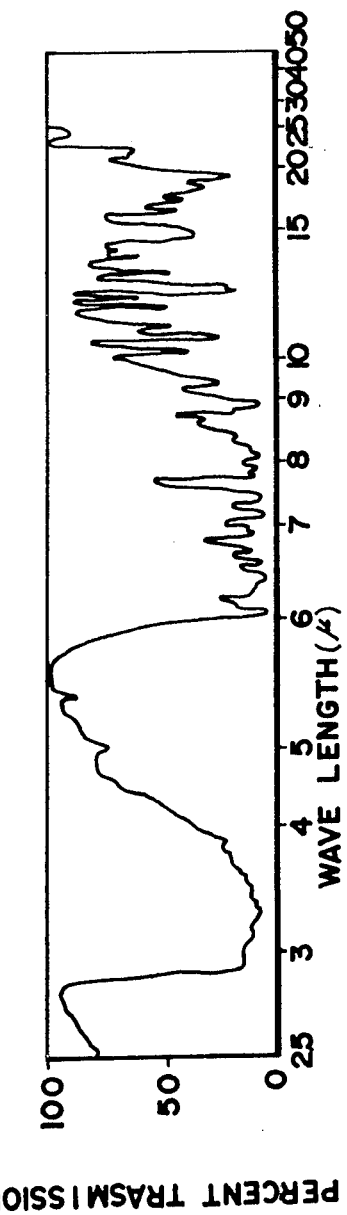

FIG. 2 an IR absorption spectrum of L-dopa alone.

Figure 3:
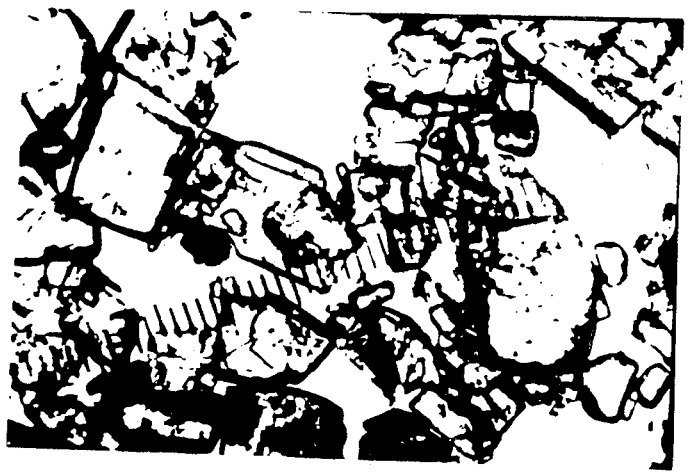

FIG. 3 is a micro photograph of L-dopa crystals and

Figure 4:
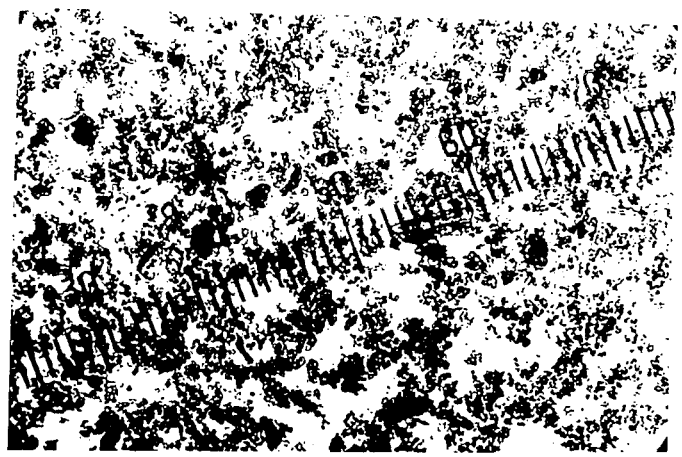

FIG. 4 a micro photograph of a L-dopa.Ca complex compound.

FIG. 5 shows concentrations of L-dopa-polyvalent metal complex compounds in blood and ① for a L-dopa.Ca complex compound, ② for a L-dopa.Zn complex compound, ③ for a L-dopa.Co complex and ④ for a L-dopa alone.

According to the present invention, a dopa preparation can be produced by dissolving a dopa in water and adding to the resulting aqueous solution at least one non-toxic polyvalent metal salt such as a salt of Ca, Co, Fe, Mn, Ni, Zn, Al, Cu or Mg, and preferably a chloride, iodide, sulfate, phosphate, nitrate, etc., thereof, or an aqueous solution thereof. The thus obtained dopa preparation is readily soluble in water and can be easily absorbed on administration to human body. According to the process of the present invention, dopas can be dissolved in a remarkably high concentration. For example, 50 mg of dopas as a dose can be dissolved in only 2 ml of water although 20 ml of water has heretofore been required for the object. Alternatively, a complex compound of a dopa with a polyvalent metal, which may be separated as amorphous fine particles, can be formulated into any suitable form such as tablets, granules, powder, etc. Also, a suspension containing the complex compound separated is particularly suitable for the preparation of an injection.

The present invention comprises reacting a dopa with a polyvalent metal salt. The process of the present invention is carried out by dissolving a dopa in water and adding to the resulting aqueous solution a polyvalent metal salt or an aqueous solution thereof to form a chelate compound.

The polyvalent metal salts which may be used in the process of the present invention are non-toxic polyvalent metal salts such as salts of calcium, cobalt, iron, manganese, nickel, zinc, aluminum, copper and magnesium. These metals may be preferably used in the form of chloride, iodide, bromide, sulfates, phosphates, nitrates, etc. The term "non-toxic polyvalent metal salts" used herein means all polyvalent metal salts, a complex compound of which with a dopa does not show such toxicity as the complex compound is unsuitable for medicines. Also, the use of a mixture of two or more of these metal compounds can give a good result.

Generally, the solubility of compounds decreases with the formation of a chelate, but a phenomenon that their solubility rather increases has been observed in the chelate compounds of the present invention. The reason for this phenomenon contrary to previous common knowledge can be explained as follows:

Dopas show low solubility since an intermolecular hydrogen bond is formed between a phenolic OH group and a COOH group in their molecule. However, if the phenolic OH group is masked by any means, the intermolecular hydrogen bond can not be formed and the compound is hydrated at —COOH or —NH$_2$ moieties of the molecule and becomes more soluble.

As described above, dopas can be dissolved in water in a high concentration according to the process of the present invention. For example, dopa can be dissolved in water in a concentration of 10 – 20 times its solubility and methyldopa can be dissolved in water in a concentration of 2–3 times its solubility. This is a surprising fact and could not be expected from previous concept on chelate. The process of the present invention has a great clinical advantage in that a solution of a high concentration can be obtained and, for example, 50 mg of dopa as a dose can be dissolved in only 2 ml of water although 20 ml of water has heretofore been required for the object.

When a dopa is reacted with at least one polyvalent metal salt in a comparatively small amount of water, the resulting complex compound of the dopa with the polyvalent metal is separated as amorphous fine particles. Therefore, the complex compound powder can be obtained by subjecting the thus formed fine particles to centrifugation or lyophilization. The complex compound powder may be converted into any suitable form such as tablets, granules, etc. If the compound may be used as a suspension, a dispersing agent can be added to the suspension containing the complex compound separated as such to produce a preparation. Therefore, the suspension is particularly suitable for the preparation of an injection.

It is surprising that complex compounds of dopas with polyvalent metals show a higher concentration in blood than the dopas alone. The detailed reason therefor is not yet clear, but the better absorption of the complex compounds in vivo is considered to be owing to the fact that the complex compounds are formed in the form of amorphous very fine particles.

The following examples illustrate the process of the present invention in more detail.

EXAMPLE 1

3.54 g of dopa was suspended in 10 ml of water for injection and hydrochloric acid was added to dissolve dopa. Then, 2.16 g of aluminum chloride (hexahydrate) was added and 200 mg of sodium bisulfite was added with neutralizing with an aqueous sodium hydroxide solution. The pH of the mixture was adjusted to 7.5 by the addition of an aqueous sodium hydroxide solution and the mixture was made up to 100 ml with water for injection. Thus, a highly concentrated aqueous solution containing 35.4 mg/ml was obtained. (The solubility of dopa in water 2.5 mg/ml).

EXAMPLE 2

2.63 g of dopa and 400 mg of sodium bisulfite were suspended in 10 ml of water for injection and an aqueous sodium hydroxide solution was added to dissolve dopa. Then, 1.38 g of zinc chloride was added. The pH of the mixture was adjusted to 9 by the addition of hydrochloric acid and the mixture was made up to 100 ml with water for injection. Thus, a highly concentrated aqueous solution containing 26.3 mg/ml of dopa was obtained.

EXAMPLE 3

The same procedure as in Example 2 was repeated except that 1.38 g of zinc chloride was replaced by 2.54 g of borax ($Na_2B_4O_7 \cdot 10H_2O$). Thus, a highly concentrated aqueous solution containing 26.3 mg/ml of dopa was obtained.

EXAMPLE 4

2.63 g of dopa was suspended in 10 ml of water for injection and hydrochloric acid was added to dissolve dopa. Then, 1.67 g of ferrous sulfate ($FeSO_4 \cdot 7H_2O$) was added. After dissolution, 200 mg of sodium bisulfite was added, with neutralizing with an aqueous sodium hydroxide solution, to adjust the pH of the mixture to 7.5 and the mixture was made up to 100 ml with water for injection. Thus, a highly concentrated aqueous solution containing 26.3 mg/ml of dopa was obtained.

EXAMPLE 5

3.7 g of methyldopa was suspended in 10 ml of water for injection and hydrochloric acid was added to dissolve methyldopa. Then, 3.6 g of aluminum chloride (hexahydrate) was added. After dissolution, 200 mg of sodium bisulfite was added, with neutralizing with an aqueous sodium hydroxide solution, to adjust the pH of the mixture to 7.3 and the mixture was made up to 100 ml with water for injection. Thus, a highly concentrated aqueous solution containing 37.0 mg/ml of methyldopa was obtained. (The solubility of methyldopa in water 10–15 mg/ml).

EXAMPLE 6

5.26 g of dopa and 0.8 g of sodium bisulfite were suspended in 20 ml of water for injection and an aqueous sodium hydroxide solution was added dropwise to dissolve dopa. Then, a previously prepared solution of a mixture of 2.2 g of magnesium sulfate (heptahydrate) and 1.08 g of aluminum chloride (hexahydrate) in 20 ml of water for injection was added to the aqueous dopa solution prepared above. The pH of the mixture was adjusted to 9 by the addition of dilute hydrochloric acid and the mixture was then made up to 200 ml with water for injection. Thus, a highly concentrated aqueous solution containing 26.3 mg/ml of dopa was obtained.

EXAMPLE 7

The same procedure as in Example 6 was repeated except that an amount of magnesium sulfate (heptahydrate) used was 1.09 g and an amount of aluminum chloride (hexahydrate) used was 1.07 g. Thus, a highly concentrated aqueous solution containing 26.3 mg/ml of dopa was obtained.

EXAMPLE 8

12 g of sodium hydroxide and 3 g of sodium sulfite were dissolved in 300 ml of water and 39.4 g of L-dopa was added. To the resulting solution was added a solution of 29.4 g of calcium chloride (dihydrate) in 100 ml of water with stirring to separate crystals of L-dopa·calcium complex compound. The crystals were collected and dried in an $N_2$ stream or lyophilized to obtain the complex compound powder.

FIG. 1 shows an IR absorption spectrum of the thus obtained L-dopa·calcium complex compound. FIG. 2 shows an IR absorption spectrum of L-dopa alone. (Both of the IR absorption spectra were measured according to a Kbr method.) It is clear from FIGS. 1 and 2 that a substance other than L-dopa was obtained by the process of the present invention.

Also, micro photographs of the two substances are shown in FIGS. 3 and 4. It is clear from FIG. 4 that the calcium complex compound was separated as a very fine amorphous substance.

EXAMPLE 9

The same procedure as in Example 8 was repeated except that 29.4 g of calcium chloride was replaced by 27.2 g of zinc chloride. Thus, L-dopa zinc·complex compound was obtained.

EXAMPLE 10

The same procedure as in Example 8 was repeated except that 29.4 g of calcium chloride was replaced by 47.6 g of cobalt chloride (hexahydrate). Thus, L-dopa·cobalt complex compound was obtained.

A test example wherein the thus obtained complex compounds of dopas with polyvalent metals showed a very high concentration in blood is given below.

TEST EXAMPLE a. Preparation of a Ca complex compound liquid 0.8 g of sodium carboxymethylcellulose was dissolved in 250 ml. of water for injection. To the resulting solution were added 12 g of sodium hydroxide and 3 g of sodium sulfite and then 40 g of L-dopa was added. To the resulting solution was added a solution or dispersion of 29.4 g of calcium chloride (dihydrate) in 70 ml of water for injection with stirring. The pH of the mixture was adjusted to 9 and the mixture was made up to 400 ml with water for injection.

b. Preparation of a Zn complex compound liquid

The same procedure as in (a) above was repeated except that 29.4 g of calcium chloride was replaced by 37.2 g of zinc chloride. Thus, a Zn complex compound liquid was prepared.

c. Preparation of a Co complex compound liquid

The same procedure as in (a) above was repeated except that 29.4 g of calcium chloride was replaced by 47.6 g of cobalt chloride (hexahydrate). Thus, a Co complex compound liquid was obtained.

d. Preparation of an L-dopa alone liquid (control)

0.8 g of sodium carboxymethylcellulose and 3 g of sodium sulfite were dissolved in 350 ml of water for injection. In the resulting solution was dispersed 40 g of L-dopa crystal. The pH of the dispersion was adjusted to 9 and the dispersion was made up to 400 ml with water for injection.

Each liquid obtained in (a), (b), (c) and (d) above was administered to three beagle dogs each having a body weight of 10-13 kg by an intramuscular injection and the concentration of each compound in blood was measured. FIG. 5 shows the average concentrations of each compound in blood ($n=3$) and ① for the L-dopa·Ca complex compound, ② for the L-dopa·Zn complex compound, ③ for the L-dopa·Co complex compound and ④ for L-dopa alone as a control.

As is clear from this drawing, the dopa-polyvalent metal complex compounds obtained by the process of the present invention showed a far higher concentration in blood than dopa alone.

What is claimed is:

1. A process for producing a L-dopa preparation which comprises reacting an L-dopa with at least one non-toxic polyvalent metal salt of a chloride, iodide, bromide, sulfate, phosphate or nitrate and the metal of which is Ca, Co, Mn, Zn or Mg.
2. A process according to claim 1, wherein a reaction product of a dopa with said non-toxic polyvalent metal salt is obtained as a highly concentrated solution.
3. A process according to claim 1, wherein a reaction product of a dopa with said non-toxic polyvalent metal salt is separated as an amorphous complex compound.
4. The process of claim 1 wherein the metal is Ca.
5. The process of claim 1 wherein the metal is Co.
6. The process of claim 1 wherein the metal is Mn.
7. The process of claim 1 wherein the metal is Zn.
8. The process of claim 1 wherein the metal is Mg.
9. An amorphous complex of an L-dopa and Ca, Co, Mn, Zn or Mg.
10. A Ca complex of claim 9.
11. A Co complex of claim 9.
12. An Mn complex of claim 9.
13. A Zn complex of claim 9.
14. A Mg complex of claim 9.

* * * * *